Feb. 21, 1956 A. E. CANFORA 2,735,889
AUTOMATIC TELEGRAPH CYCLING CONTROL APPARATUS
Filed Sept. 14, 1953 5 Sheets-Sheet 1

INVENTOR.
ARTHUR E. CANFORA
BY
Charles H. Brown
ATTORNEY

Feb. 21, 1956 A. E. CANFORA 2,735,889
AUTOMATIC TELEGRAPH CYCLING CONTROL APPARATUS
Filed Sept. 14, 1953 5 Sheets-Sheet 5

Fig. 3(c)

INVENTOR.
ARTHUR E. CANFORA
BY
Charles H. Brown
ATTORNEY

United States Patent Office

2,735,889
Patented Feb. 21, 1956

2,735,889

AUTOMATIC TELEGRAPH CYCLING CONTROL APPARATUS

Arthur Eugene Canfora, Brooklyn, N. Y., assignor to Radio Corporation of America, a corporation of Delaware Application September 14, 1953, Serial No. 379,859

19 Claims. (Cl. 178—23)

The invention relates to automatic request and repetition telegraph systems. It particularly pertains to an electronic control system for automatically controlling the operation of such an automatic telegraph system.

There is a system of multiplex telegraphy now in operation over a combination of land wire and radio telegraph transmission mediums which involves a plurality of telegraph channels transmitting in one direction between two remotely located stations and a like number of channels transmitting in the opposite direction between the same two stations. Normally, transmission between the two stations takes place simultaneously in both directions, and, to a great extent, independently as well. Circuitry is provided in each channel at the receiving station to check the incoming signal for possible mutilation of the individual characters. This circuitry is so arranged that upon receiving a mutilated character at one station over one channel, the transmission from that one station in the opposite direction is halted in the associated channel and a signal requesting repetition of the mutilated character is transmitted over the associated channel to the other station. At this other station the receiving circuitry causes a retransmission of the character under consideration. This is made possible by previously storing the last several characters until it is known that they have been correctly received and transmitting from the store until the character under consideration is correctly received. Preferably, the electronic telegraph cycling control system according to the invention is used to control the functioning of the component electronic apparatus of the overall automatic request and repetition telegraph signalling system, which functioning during the request and repetition mode of operation is termed cycling.

An object of the invention is to control an automatic telegraph request and repetition system electronically.

Another object of the invention is to provide an improved electronic control system for an automatic request and repetition telegraph system which is simple in operation and which does not require involved operation and maintenance procedures.

The objects of the invention are attained in cycling control apparatus for automatically repeating transmitted code characters in response to the receipt of a mutilated character or a predetermined character requesting repetition, wherein synchronizing pulses obtained from receiving terminal apparatus which tend to continually cycle the system in the correction mode are presented through a normally closed counter gate to a pulse counter circuit which counts off a predetermined number, N, of character intervals constituting a single cycle of correction or repetition operation of the apparatus. An output voltage from the pulse counter circuit is applied to a circuit indicating the first character interval in every count of N characters. This first count information is applied to the transmitting storage and switching apparatus, which during this time establishes the predetermined repetition requesting signal character in store and causes the stored characters to be transmitted. Stop pulses from the pulse counter are applied through an off gate for the requested repetition cycling control unit after every Nth character intervals only. A first count interval indicator is connected to first count interval information circuit and the requested repetition cycling control unit to indicate whether the cycling control apparatus is responding to a received mutilated character or a specific request for repetition at the first character interval of each count of N characters. If the receiving code translator detects a mutilated character, potential is applied to a character mutilation gate having an output connected to the character mutilation cyling control and a further connection to an off gate for mutilated character response. If the character mutilation-on gate is activated, a synchronizing pulse is applied to the mutilation cycling control. If there is information indicating that a specific request for repetition has been detected by the receiving code translator to gate the requested repetition on gate, a synchronizing pulse is applied to the requested repetition cycling control. Either the requested repetition cycling control or the character mutilation cycling control is activated. The counter gate will be opened indirectly through a counter-on information circuit to permit synchronizing pulses to be applied to the pulse counter. The requested repetition character-off gate and the character mutilation-off gate are arranged to prevent the deactivation of the requested repetition cycling control and the character mutilation cycling control respectively, if either character mutilation information or a specific request for repetition is presented at the time a stop pulse is due from the pulse counter.

If the automatic signalling system is cycling in response to reception of a mutilated character, the cycling control can only be deactivated by deactivation of the requested repetition cycling control. The requested repetion cycling control must be first be activated by receipt of the predetermined requested repetition character signal before the corresponding cycling control can be deactivated at the end of a predetermined character interval by a pulse from the pulse counter.

If the cycling control apparatus operates in response to the predetermined requested repetition character, the requested repetition character on gate is opened to activate the requested repetition cycling control. This action opens the counter gate through the counter-on information circuit and allows a count of N character intervals to be made. After this count a stop pulse from the pulse counter is applied to the requested repetition cycling control and thereby releases the influence of the cycling control apparatus over the automatic telegraph signalling system. The counter-on information circuit applies voltages to the storage and switching apparatus to indicate that the cycling control apparatus is in operation and that the telegraph system is cycling. As long as this information is applied to the storage and switching apparatus, code signal characters are transmitted from the storage banks of that apparatus and the transmission of any further characters is held up.

An operate pulse stretch and delay circuit is arranged to shape and time operating pulses for the transmitter distributor and is also used to clear a stored convert pulse from a convert pulse storage unit for transfer to a convert pulse combining circuit at the proper time for reactivation of the transmitting code translator.

In the automatic telegraph signalling system for which the control apparatus according to the invention is intended, are two types of idling signals used to indicate the service in which this system is operating. One of the m-unit code character signals is referred to as idle alpha and, when the receiving code translator detects that character, a pulse is applied to an alpha signal gate which causes an indication of this received character to be set up in an idling signal indicator. If an idle beta signal is detected by the receiving code translator, a pulse is applied to a beta gate for indication on the idling signal indicator. Whenever either of these signals is received, the circuit is arranged to keep the receiving channel idle and the corresponding gate is arranged to block the convert pulses normally applied to the receiving code translator. During cycling there may occur one convert pulse originating in the transmitting extensor. This pulse must be stored and is therefore gated by the counter-on gate to the convert pulse storage circuit which stores the pulse for use immediately after cycling is completed.

In order that the invention may be more clearly understood and readily put to practical use, the circuit arrangement embodying the invention is hereinafter described, by way of example only, with reference to the accompanying drawing in which.

Figure 1:
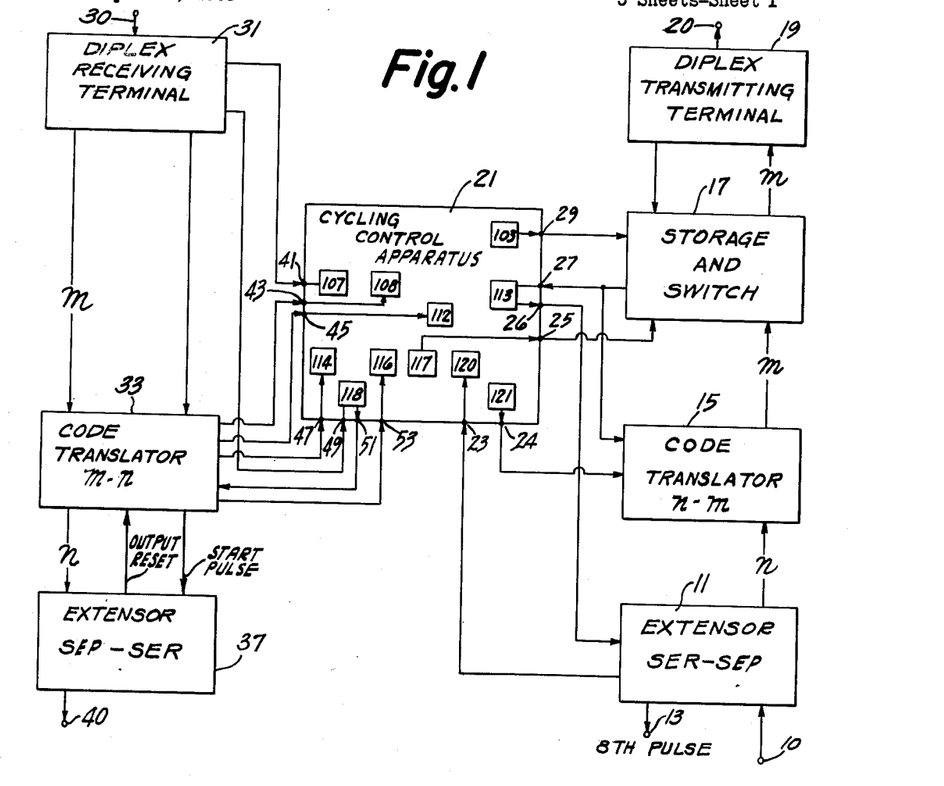
Fig. 1 is a functional diagram of an automatic request and repetition telegraph signalling system.

A specific automatic request and repetition telegraph signalling system for which the cycling control apparatus according to the invention is intended is shown in a functional diagram of Fig. 1. A train of serially appearing signal elements is applied to the input terminals 10 of an extensor 11. Usually the source of signals applied to the terminals 10 is a transmitting distributor of the electromechanical type, which type of distributor requires an activating or "8th pulse" which is made available at the terminals 13. The extensor 11 serves to transpose each character from the train of serially appearing signal elements on a single circuit into signal elements sequentially presented over $n$ separate circuits to a code translator 15. This code translator 15 serves to translate an $n$-element code into an $m$-unit code, preferably a protected code, having a constant ratio of marking to spacing signal elements, for application to storage and switching apparatus 17. In normal operation the storage and switching apparatus merely serves to transfer the $m$-unit signal appearing on separate circuits to diplex transmitting terminal apparatus 19 for subsequent transmission at the terminals 20 to a multiplex radio telegraph transmitter. The storage and switching apparatus 17 stores the signal elements of the last N characters for a time period equal to the transmission time for N characters, or until the characters have been correctly received, in case a request is made for a repetition of the stored signal characters as will later be described.

As shown, the transmitting arrangement preferably comprises an electronic extensor of the type shown and described in copending U. S. patent application Serial No. 377,618, filed August 31, 1953, on behalf of Arthur E. Canfora and Samuel Sharin; an electronic code translator of the type shown and described in copending U. S. patent application, Serial No. 375,995, filed August 24, 1953, on behalf of Arthur E. Canfora, Eugene R. Shenk, Anthony Liguori and H. James Kishi; electronic storage and switching apparatus of the type shown and described in copending U. S. patent application Serial No. 379,826, filed September 14, 1953, on behalf of James C. Phelps, Arthur E. Canfora, Anthony Liguori, and Dominick Mandato, Jr.; and electronic transmitting diplex terminal apparatus preferably of the type shown and described in copending U. S. patent application Serial No. 279,432 filed March 29, 1952, on behalf of Arthur Eugene Canfora and Anthony Liguori. However, other known equivalent apparatus may be substituted therefor if desired. The arrangement as shown and thus far described forms a complete transmitting channel for non-automatic transmission when connected together as shown and described in the respective patent applications mentioned above.

In order to form an automatic request and repetition telegraph system, it is necessary that certain connections be made which will permit the interruption of the normal non-automatic transmitting functions. Such connections are made through the cycling control apparatus 21, a more detailed description of which will be given hereinafter in connection with the operation of an automatic request and repetition telegraph system. A lead from the transmitting extensor 11 to terminal 23 of the cycling control apparatus 21 and thence to another terminal 24 to the transmitting code translator 15 is used to convey a code convert pulse from the extensor 11 to the code translator 15 to coordinate the operation of the two units. Two other leads interconnect the extensor 11 and the storage and switching apparatus 17 through the cycling control apparatus 21 at terminals 26 and 27 to provide a necessary pulse delay between the reset pulse obtained from the storage and switching apparatus 17 and applied to the extensor 11 to step the succeeding characters through the transmitting system. Other leads connected to the terminals 25 and 29 of the cycling control apparatus 21 are used only in the automatic signalling system and description thereof will be made hereinafter.

Signals appearing at the output terminals 20 are applied to a multiplex transmitting system for use between the local and distant stations. An excellent description of such a multiplex transmitting system is given in the copending U. S. patent application Serial No. 312,346 for Electronic Diplex Receiving Distributor filed September 30, 1952, on behalf of Anthony Liguori and Eugene R. Shenk.

Signals transmitted from the distant station are received by a multiplex receiver and applied to input terminals 30 of diplex receiving terminal apparatus 31. The diplex receiving terminal apparatus 31 presents sequentially appearing signals elements over $m$ separate circuits to a code translator 33. A reset pulse is applied to the code translator 33 over a separate circuit emanating from the diplex receiving terminal apparatus 31. The code translator 33 serves to translate the $m$-element code received from the diplex receiving terminal apparatus 31 into $n$-element code for presentation to an extensor 37 which transposes the sequentially appearing code signal elements appearing on separate circuits into serially appearing elements over a single circuit at the terminal 40 for delivery eventually to a standard telegraph printer (not shown) or other utilization apparatus. An output reset pulse for the code translator 33 is sent over a separate circuit emanating from the extensor 37.

The receiving circuit arrangement thus far described is preferably composed of diplex receiving terminal apparatus as shown and described in the above mentioned copending U. S. patent application Serial No. 312,346; an electronic code translator as shown and described in the above mentioned copending U. S. patent application Serial No. 375,995; and an electronic extensor as shown and described in the above mentioned copending U. S. patent application Serial No. 377,618, although known equivalent circuits may be adapted for such use by one skilled in the art. Both the transmitting and receiving diplex terminal apparatus function exactly the same as the extensors in the system. That is they serve to transpose a signal character of several elements apearing sequentially over a single circuit to elements appearing sequentially over a plurality of separate circuits, although the diplex apparatus performs the function for two channels in each direction.

As in the case of the transmitting channel, the receiving channel thus far described is substantially complete for receiving multiplex telegraph signals on a nonautomatic basis when interconnected as shown and described in the respective copending patent applications mentioned before, except that certain functions, however, are interrupted by the cycling control apparatus 21. Corresponding connections are therefore bridged for nonautomatic operation by circuits in the cycling control apparatus 21. One such connection passes from the receiving diplex terminal apparatus 31 to the terminal 49 of the cycling control apparatus 21 and from terminal 51 of the cycling control apparatus 21 to the receiving code translator 33. A synchronizing or cycling control pulse is obtained from the diplex receiving terminal apparatus 31 and applied to the cycling control apparatus 21 at the terminal 41, which together with certain signal information obtained from the code translator 33 and applied to the cycling control apparatus at terminals 43 and 45 serve to trigger the cycling control apparatus 21 to "cycle" the telegraph system in the automatic request and repetition mode of operation. Additional information obtained from the code translator 33 is applied to terminals 47 and 53 of the cycling control apparatus to provide an indication thereat of the particular commercial type of operation or service to which the automatic request and repetition telegraph system is being put.

Figure 2:
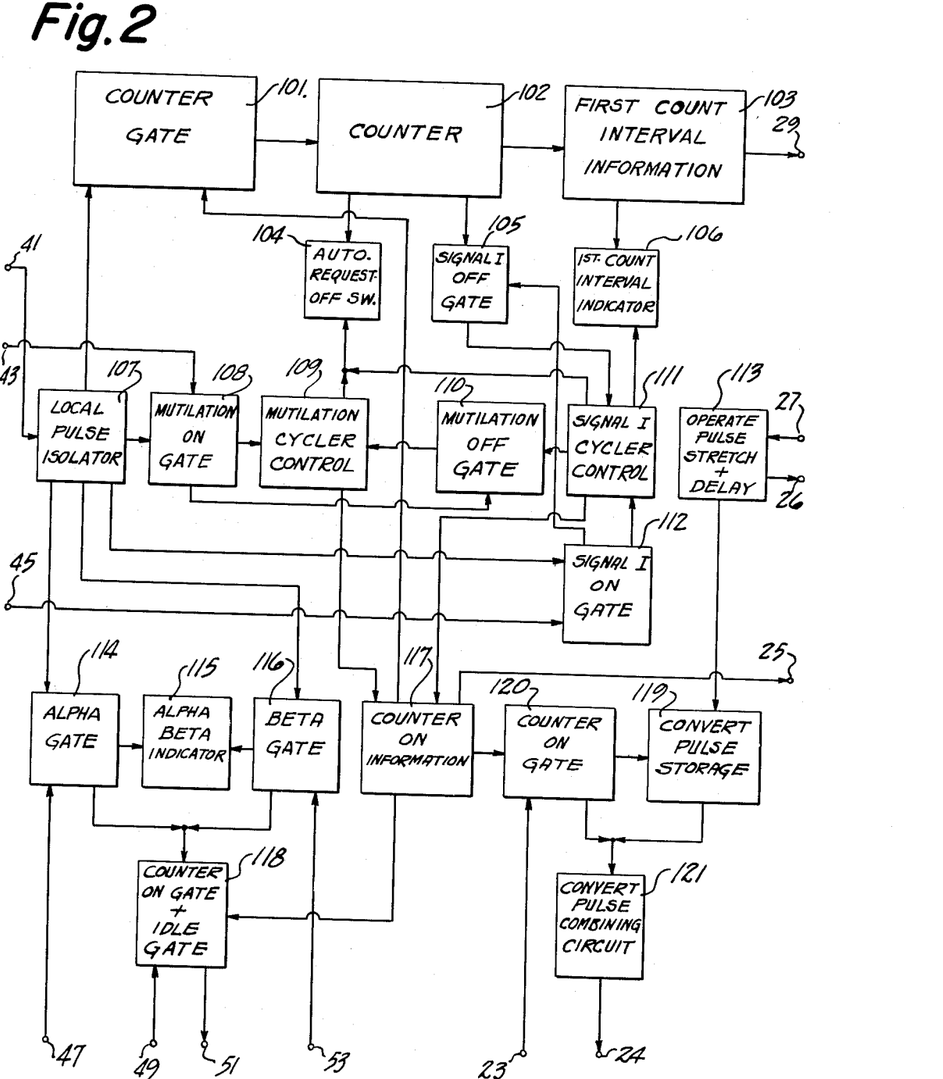
Fig. 2 is a functional diagram of a cycling control system for use in the automatic request and repetition telegraph signalling system represented in Fig. 1.

Details of the functioning of the cycling control apparatus 21 will be more clearly understood with reference to Figure 2 which shows the complete arrangement in functional form. For convenience, the cycling control apparatus 21 as shown in Figure 1 has the blocks to which the input and output terminals are directly connected shown and numbered with the same reference characters as the corresponding blocks shown in Figure 2.

In general, the control apparatus according to the invention is arranged to operate or "cycle" the entire telegraph system for a single channel in each direction in response to information received from the receiving code translator 33 indicating that a code character has been received in mutilated form or a special character requesting signal repetition transmitted by the distant station has been detected in the receiving code translator 33. Once in operation, or cycling, the apparatus is arranged to continue to function for N full character intervals or multiples thereof. If set in operation by the reception of a mutilated character, the apparatus is arranged to continue cycling until reception of the same special character originally assigned for requesting repetition is received and to terminate cycling at the end of the N-character group during which this predetermined signal was received. If set in operation by reception of the predetermined repetition requesting character, cycling will endure for N character intervals only. The apparatus is also arranged to continue operation uninterruptedly if information indicates either that a character mutilation or the predetermined repetition requesting character is presented at the same time that cycling would otherwise be due to stop.

A functional diagram of the cycling control apparatus 21 for automatically repeating transmitted code characters in response to received signals initiating such repetition is shown in Figure 2. Synchronizing pulses obtained from the receiving diplex terminal apparatus 31 are applied to the local pulse input terminal 41 and delivered to a local pulse isolator 107. This local pulse isolator 107 serves to repeat the synchronizing pulses and to prevent deterioration in amplitude and delay in time which might occur if the pulses were applied directly to the utilization circuitry in the cycling control apparatus 21. Synchronizing pulses repeated by the pulse isolator 107 are applied to a counter gate 101 which in turn applies these pulses to a pulse counter 102 which counts off the predetermined number N, of character intervals constituting a single cycle of operation of the cycling control apparatus 21. An output voltage from the pulse counter 102 is applied to a first count interval information circuit 103 to indicate the first character interval in every count of N characters. This first count information is applied to the storage and switching apparatus 17, which during this time establishes the predetermined repetition requesting signal character (I) in store and causes that character and the other characters already stored to be transmitted. A switching element 104 is interposed in the overall circuit arrangement to render the cycling control apparatus 21 unresponsive to control information for initial phasing operations and also to preset the pulse counter circuit 102, mutilation cycler control circuit 109, and the cycler control circuit 111 for the predetermined repetition requesting signal character frequency termed "signal I" or "I." The presetting function performed by the switching element 104 ensures a count equal to the predetermined number of characters for the first cycle in each cycling operation which might otherwise be anything from zero up to that predetermined number. Stop pulses from the pulse counter 102 are applied through a requested repetition off gate 105 to the associated cycler control unit 111 after every predetermined N, character interval only. A first count interval indicator 106 is connected to a first count interval information circuit 103 and the signal I control unit 111 to indicate whether the cycling control apparatus 21 is responding to a received mutilated character or a received specific request for repetition at the first character interval of each count of N characters. This circuit is used to advantage in determining the location of any trouble in the circuit which establishes a prolonged cycling operation and enables the operating technician to localize the trouble to one end or the other of the overall transmitting-receiving loop. If the receiving code translator 33 detects a mutilated character, voltage is applied to the input terminals 43 of the cycling control apparatus 21 which are connected to a character mutilation gate 108. This gate is coupled to the local pulse isolator 107 and has an output connected to the character mutilation cycler control 109 and a further connection to a character mutilation-off gate 110. If the character mutilation-on gate 108 is open, a synchronizing pulse repeated by the local pulse isolator 107 is applied to the character mutilation cycler control 109. If there is information indicating that a request for repetition has been detected in the receiving code translator 33 as seen at the input terminals 45 to gate the requested repetition-on gate 112, a synchronizing pulse, as repeated by the local pulse isolator 107, is applied to the signal I cycler control 111. If either the signal I cycler control 111 or the character mutilation cycler control 109 is activated, the counter gate 101 will be activated indirectly through a counter-on information unit 117 to permit synchronizing pulses from the local pulse isolator 107 to be applied to the pulse counter 102. The synchronizing pulses repeated by the local pulse isolator 107 will, when ungated by the counter gate 101, cause the automatic telegraph system to cycle indefinitely. The signal I-off gate 105 and the character mutilation-off gate 110 are arranged to prevent the deactivation of the signal I cycler control 111 and the character mutilation cycler control 109, respectively, if either mutilation information or a request for repetition is presented at the time a stop pulse is due from the pulse counter 102.

If the automatic signalling system is operating under the influence of the cycling control apparatus 21 in response to information from the code translator 33 indicating the reception of a mutilated character, the circuit is arranged to activate the character mutilation cycler control 109. This cycler control can be deactivated only by deactivation of the signal I cycler control 111. The signal I cycler control 111 must first be activated by receipt of the predetermined repetition requesting character (I) before the signal I cycler control 111 can be deactivated at the end of a predetermined character interval by a pulse from the pulse counter 102.

If the cycling control apparatus 21 is operating in response to information from the code translator 33 that the predetermined repetition requesting character, or signal I, was received and applied to the terminal 45 in the form of a pulse which activates the signal I-on gate 112 to activate the signal I cycler control 111, this action opens the counter gate 101 through the activation of the counter-on information circuit 117 and allows a count of N character intervals to be made. After this count a stop pulse from the pulse counter 102 is applied to the signal I-off gate 105 to deactivate the corresponding cycler control 111 and thereby release the control of the cycling apparatus 21 over the automatic telegraph signalling system. The counter-on information circuit 117 applies voltages to the storage and switching apparatus 17 at the terminals 23 to indicate that the cycling control apparatus 21 is in operation. As long as this information is applied to the storage and switching apparatus 17, code signal characters are transmitted from the storage banks of that apparatus and the transmission of all other signal characters is held up.

An operate pulse stretch and delay circuit 113 is arranged to shape and time operating pulses for the transmitter-distributor (not shown), which are delivered through the terminal 26 of the cycling control apparatus 21 and the amplifier portion of the transmitting extensor 11 to the terminal 13, the latter connections being explained in detail in the above mentioned copending U. S. Patent application Serial No. 377,618. The input pulses to the stretch and delay unit 113 are obtained from the diplex transmitting terminal apparatus 19 through the storage and switching apparatus 17 which is arranged to block these pulses when the automatic telegraph system is cycling. The first of these operating pulses to reach the stretch and delay circuit 113 at the terminal 27 after cycling is also used to clear a stored convert pulse from a convert pulse storage unit 119 stored during cycling for delivery to a convert pulse combining circuit 121 for application to the transmitting code translator 15.

In the automatic telegraph signalling system previously described it is desired that two types of idling signals be used to indicate the service in which this signalling system is operating. The seven-unit "protected" code has 35 characters, each having three marking elements, against 32 characters—including the all-spacing or blank—for the five-unit printer code. The "extra" characters of the seven-unit code are assigned to the two idle signals and the specific request for repetition that is termed signal I. One of the extra M-unit code characters is referred to as "idle alpha" and when the code translator 33 detects such a character, a voltage is applied to the alpha gate 114 which causes an indication of this received character to be set up in an idle signal indicator 115. If an idle beta signal is detected by the receiving code translator 33, a voltage is applied to the beta gate 116 for indication on the idle signal indicator 115. When either of these signals is received the receiving equipment is held idle by an arrangement wherein the alpha gate 114 or the beta gate 116 modifies convert pulses in a convert-or-on and idle gate 118. This latter gate 118 is arranged to block the convert pulses passing from the receiving diplex terminal apparatus 31 to the receiving code translator 33.

The circuit is arranged so that if a convert pulse is formed during cycling it is gated by the counter-on gate 120. The convert pulses originate in the transmitting extensor 11 and are applied to the transmitting code translator 15 by way of the convert pulse combining circuit 121 at the terminals 24. The pulse which is gated out is rerouted to the convert pulse storage unit 119 where it is stored during cycling for use immediately after cycling in reactivating the transmitting equipment.

Figure 3:
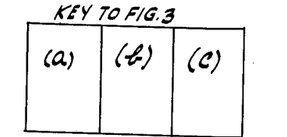
Fig. 3 is a schematic diagram of a circuit arrangement according to the invention for performing the functions indicated in the illustration of Fig. 2.
Figure 3A:
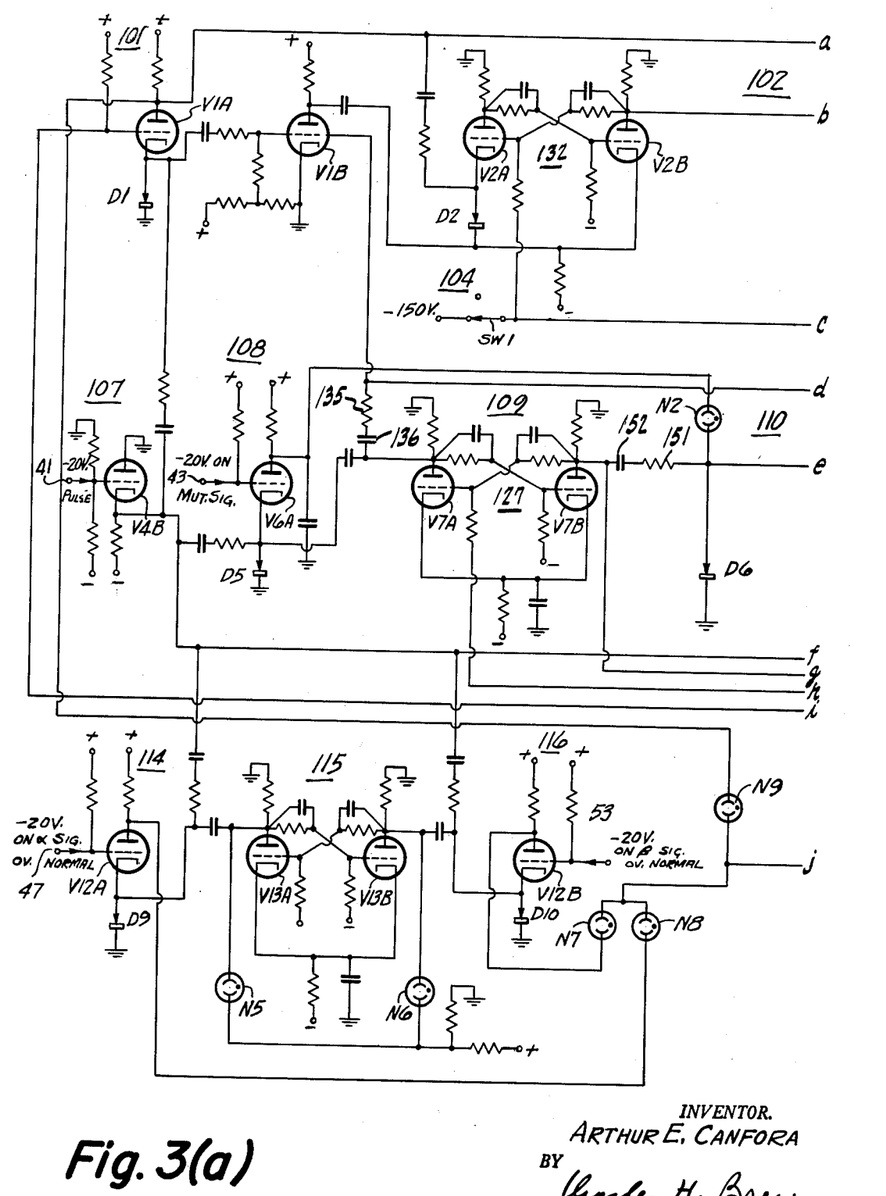
Figure 3B:
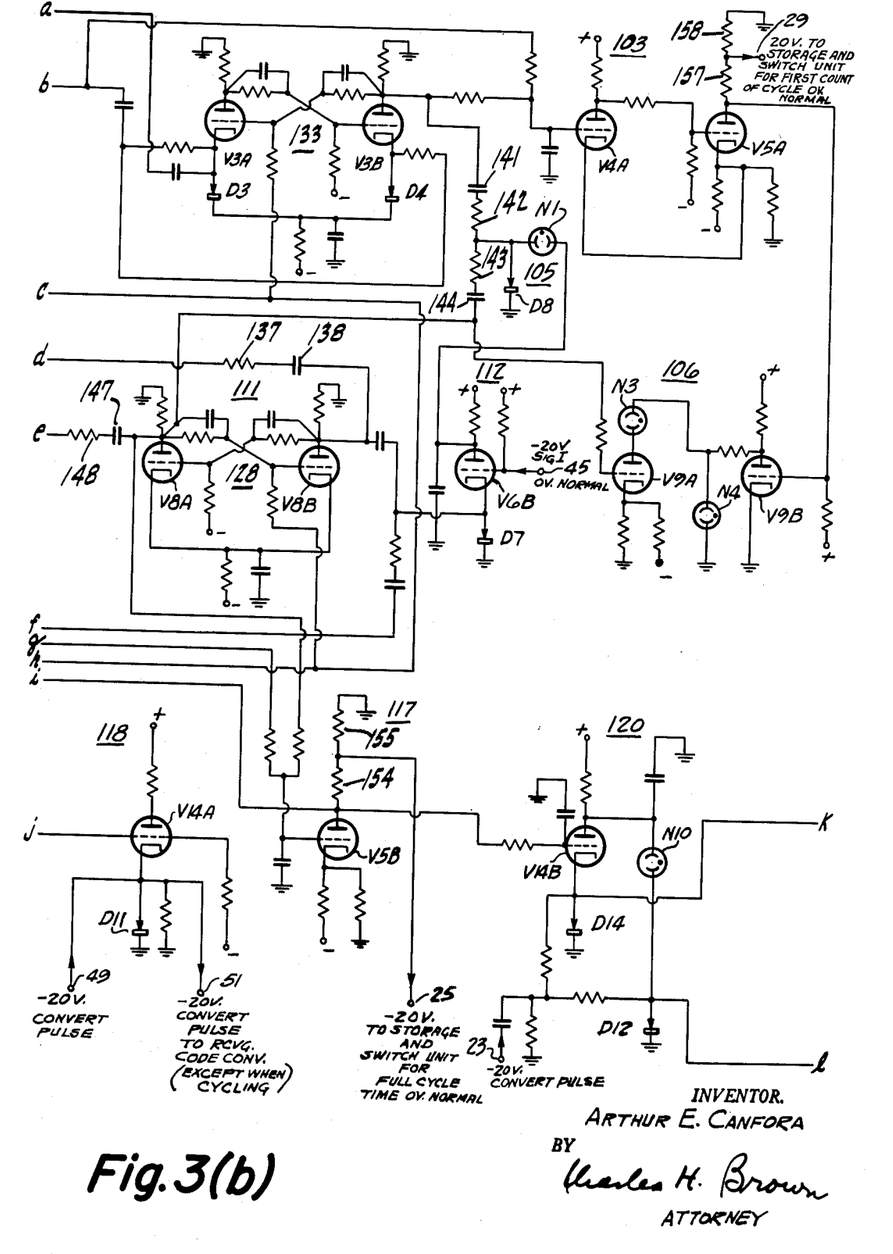
Figure 3C:
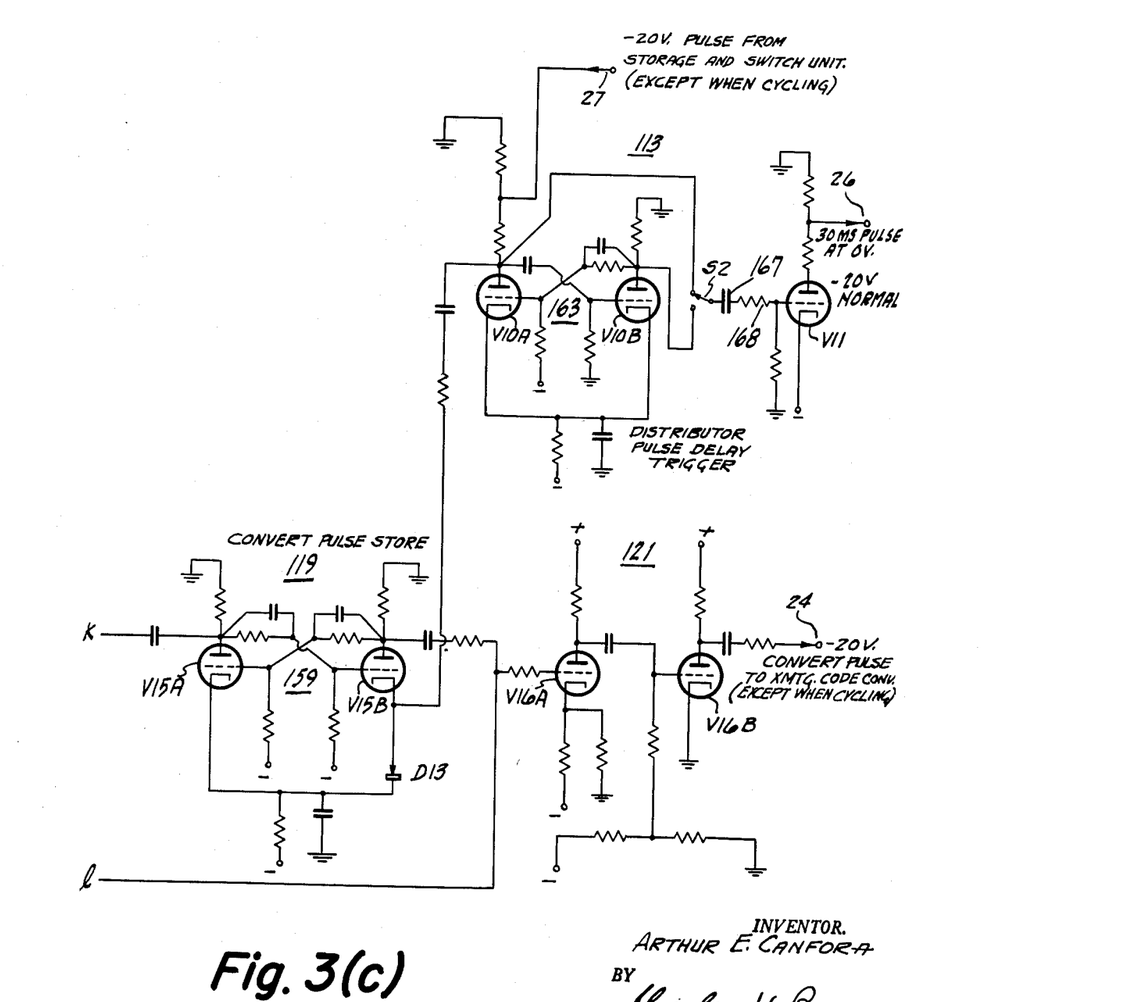

A schematic diagram of circuits specifically designed to perform the functions indicated in the functional diagram of Fig. 1 is given in Fig. 3. The circuit arrangement shown in Fig. 3 is specifically designed to operate on a four character cycle. However, in accordance with the teachings herein set forth, those skilled in the art will be able to construct circuits having cycling periods of any number of characters desired without departing from the spirit and scope of the invention.

Figure 4:
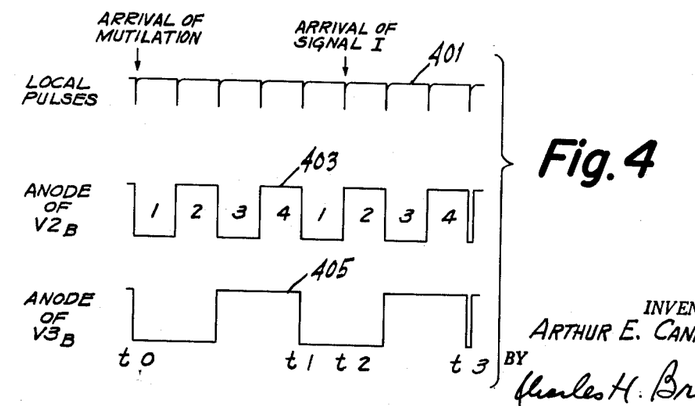
Fig. 4 is a graphical representation of certain pertinent wave forms which are developed by the circuit arrangement of Fig. 3 in operation according to the invention.

The synchronizing pulse isolator 107 is constituted by a cathode follower tube V4B which acts as a low impedance repeater for the synchronizing pulses applied between the grid of the tube V4B at the synchronizing pulse terminal 41 and ground. The negative pulses obtained from the cathode of the tube V4B are applied to the anodes of the tube V7A of the character mutilation cycler control 109 and the tube V8B of the requested repetition or signal I cycler control 111 which are bistable reciproconductive circuits. As employed herein the term "reciproconductive circuit" is construed to include all two tube regenerative circuits in which conduction alternates in one or the other tube in response to applied triggering potentials. This basic circuit is sometimes termed a "multivibrator." The bistable reciproconductive circuit is one in which two triggers are required to transfer conduction from one tube to the other. One form of bistable reciproconductive circuit requires triggering at alternate inputs in order to cause conduction to reciprocate between the two tubes. This configuration is termed a "lockover" reciproconductive circuit as distinguished from the "binary" reciproconductive circuit which is one which has a single input terminal to which triggering potentials are applied to reverse the state of conduction each time the trigger is applied to the one terminal. The tubes V7A and V7B are cross-coupled in conventional bistable lockover reciproconductive circuit configuration. The tubes V8A and V8B are likewise connected in the conventional lockover reciproconductive circuit configuration. These two circuits are arranged so that the tube V7B and the tube V8A are conducting under normal non-cycling signalling conditions. Pulses from the cathode of the tube V4B are applied so that the bistable reciproconductive circuits 127 and 128 tend to reverse the states of conduction to those wherein the tubes V7A and V8B respectively are conducting. Under normal signalling conditions, the receiving code translator 33 is not applying any potential to the grids of the gating tubes V6A and V6B so that these tubes are conducting through the diodes D5 and D7 respectively. Currents passing through the diode D5 in the cathode lead of the character mutilation gating tube V6A and the diode D7 in the cathode of the signal I gating tube V6B prevent the pulses obtained from the cathode of the isolating cathode follower V4B from activating the reciproconductive circuits 127 and 128 in the manner described. With the tubes V7A and V8B blocked, the anodes of the respective cross-coupled tubes V7B and V8A are maintained at a potential negative with respect to ground. This causes the tube V5B of the counter-on information circuit 117 to be blocked, putting positive voltage on the grid of the gating tube V1A of the counter gate 101. The counter gating tube V1A is then conducting through the diode D1 in the cathode circuit. This conduction prevents pulses from the synchronizing pulse isolator 107 from reaching the input of the pulse counter 102. The pulse counter 102 comprises two binary reciproconductive circuits comprising the tubes V2A, V2B and V3A, V3B connected in cascade to form a binary counting chain. If a mutilated character or a request for repetition is detected in the receiving code translator 33, a negative potential will be applied to the grid of the tube V6A or V6B and that one tube will be blocked. Because the gating diode D5 or D7 in the cathode circuit of the tube under consideration will no longer bypass the synchronizing pulses as obtained from the cathode of the isolating tube V4B and the corresponding reciproconductive circuit 127 or 128 will be triggered to the other bistable state of conduction, the anode of either the tube V7B or V8A will now be near ground potential, as a result of which the counter-on information tube V5B is rendered conductive. The resulting negative voltage at the anode of the counter-on information tube V5B applies the negative voltage to the grid of the counter gating tube V1A blocking current flow through the diode D1. Negative pulses from the cathode of the isolating tube V4B are now applied to the pulse counter 102 by way of the amplifier tube V1B. The very same pulse that activated either the character mutilation cycler control 109 or the signal I cycler control 111 to open the counter gate 101 for that pulse and the succeeding four pulses must be effective in acting upon the first binary reciproconductive circuit 132. Since there is some finite time interval before the diode D1 is blocked, this first pulse arrives at the diode D1 and is gated out and lost before the diode is blocked. The circuit is arranged, however, to substitute a pulse derived from the transition from either of the tubes V7A or V8B by way of the differentiating networks comprising the resistors 135 and capacitor 136 or the resistor 137 and capacitor 138 for the lost pulse. The substitute pulse is applied directly to the grid of the amplifier tube V1B beyond the gating diode D1. The succeeding pulses, of course, are obtained from the cathode of the isolating tube V4B. The curves given in Fig. 4 represent an example of waveforms obtained in the operation of the circuit arrangement as shown in Fig. 3. Curve 401 represents the synchronizing pulses obtained from the diplex receiving terminal apparatus 31. At the time $t_0$ mutilation information is presented at the terminals 43 leading to the grid of the mutilation signal gating tube V6A. As previously described, this pulse will activate the character mutilation cycler control 109 allowing the synchronizing pulses to be applied to the input of the pulse counter 102. At a time $t_1$, after a four character-interval count, the anode of the output tube V3B of the pulse counter 102 will be subjected to a negative going transition. A negative pulse derived from this transition by means of the differentiating networks comprising the capacitors 141, 144 and the resistors 142, 143 which are connected to the anode of the tube V8A, tends to force the reciproconductive circuit 128 into the stable state of conduction with the tube V8B blocked. The reciproconductive circuit 128, however, has not been triggered from the normal state of conduction with the tube V8A conducting, so that at the time $t_1$ the pulse obtained from the anode of the tube V3B has no effect. The reciproconductive circuit 127 which was triggered at the time $t_0$ can be re-triggered to the initial state of conduction only by a negative pulse on the anode of the tube V7B, which pulse is to be derived from the re-triggering of the reciproconductive circuit 128. Since no such re-triggering occurs at the time $t_1$, the counting process must continue for another four character-interval period. If at time $t_2$ during this interval, repetition request information is presented at the grid of the signal I gating tube V6B, the reciproconductive circuit 128 constituting the signal I cycler control 111 is triggered. After another four character-interval, at a time $t_3$ another stop pulse is generated at the anode of the output tube V3B of the pulse counter 102. The signal I cycler control 111 constituted by the reciproconductive circuit 128, now being activated, can be deactivated by the pulse from the output tube V3B of the pulse counter 102 applied to the anode of the now blocked tube V8A. The resulting negative going transition at the anode of the tube V8A is applied to the anode of the tube V7B by way of a differentiating network comprising a capacitor 147 and a resistor 148 and another differentiating circuit comprising a resistor 151 and capacitor 152. With both the mutilation cycler control 109 and the signal I cycler control 111 deactivated, the pulse counter 102 is gated off and the entire circuit becomes quiescent. At the time $t_3$, after gating off the input pulses to the pulse counter 102, the anodes of the tubes V2B and V3B are in a different state than they were prior to the time $t_0$. If the tubes of the counter 102 are left in this state of conduction, the next cycling operation would be based on an erroneous count, however, the circuit is arranged so that the binary reciproconductive circuits 132 and 133 are returned to the initial condition. This is accomplished by utilizing the negative going transition at the anode of the counter gating tube V1A when rendered conducting in order to gate out the pulses to the counter 102 at the time $t_3$. These negative pulses are injected across diodes D2 and D3 in the cathode connections of the tubes V2A and V3A respectively, rendering these tubes conducting and thereby resetting these tubes to the initial conducting condition.

Thus the cycling control apparatus 21 counts out four character-intervals, or multiples thereof, and will continue cycling when started by mutilation information until receipt of signal I information. It should be noted that the same signal I is used both to initiate a specific request for repetition and to terminate cycling whether in response to a specific request for repetition or because of a mutilated character. If the cycling control apparatus is started cycling on the detection of the character representing specifically requested repetition, signal I, by the code translator 33, a stop pulse from the anode of the tube V3B will deactivate the signal I cycler control at the time $t_1$ to lock up the cycling control apparatus 21 without requiring any external lockup information as is required when cycling is commenced in response to a detection of a mutilated character.

The apparatus is arranged to prevent lockup when the stop pulses are derived from the anode of the output tube V3B of the pulse counter 102. If signal I information is presented at the grid of the signal I gating tube V6B at such times, the tube is blocked and the potential at the anode of the gating tube V6B is sufficiently high to cause the glow discharge device N1 to conduct through a diode D8. The stop pulse obtained from the anode of the output tube V3B of the pulse counter 102 is thus attenuated sufficiently to prevent deactivation of the signal I cycler control 111, had it been activated. If, however, signal I information is not present at the time, the signal I cycler control 111 is deactivated if it had been activated. This causes a deactivating pulse to be derived from a negative-going transition at the anode of the tube V8A to deactivate the mutilation cycler control 109. If the receiving code translator 33 indicates that a mutilated character has been received by applying potential to the grid of the mutilation gating tube V6A at this time, the pulse at the anode of the tube V8A will be attenuated by the current flow through the diode D6. This current is made available through the glow discharge device because of the fact that the gating tube V6A is blocked thereby applying a relatively high potential to the electrodes of the glow discharge device N2. The mutilation cycler control 109, if activated, is unresponsive to this attenuated pulse and remains in the activated condition.

If either of the anodes of the tube V7B or V8A or both are at a potential close to ground due to activation of the mutilation cycler control 109 or the signal I cycler control 111, the counter-on information tube V5B is rendered conducting and the junction of the two anode load resistors 154 and 155 is reduced to a voltage negative with respect to ground which is applied by way of a terminal 25 to the storage and switching apparatus 17.

During every four-count interval, the anodes of both the tubes V2B and V3B of the pulse counter 102 are at a low potential during the first count only. During this count the first count tube V4A of the first count interval information circuit 103 is blocked which in turn renders the first count output tube V5A conducting. Under these conditions, the potential at the junction of the anode load resistors 157 and 158 is rendered negative with respect to ground and is applied to the storage and switching apparatus 17. For the remaining three intervals, the anode of the tube V2B or that of the tube V3B is near ground potential, allowing the tube V4A to conduct and block the tube V5A, effectively grounding the output terminal 29 to the storage and switching apparatus 17 for the next three intervals.

Convert pulses from the transmitting extensor 11 for application to the transmitting code translator 15 are routed through the cycling control apparatus 21 between the terminals 23 and 24. Normally the gating tube V14B of the counter-on gate 120 is conducting through the diode D14 because the anode of the normally blocked counter-on gating tube V5B is at ground potential. The convert pulses appearing at the terminal 23 which would be applied at the anode of the tube V15A of the convert pulse store 119 are gated out by the diode D14. With the gating tube V14B normally conducting, the anode potential is low and consequently the glow discharge device N10 is extinguished. The diode D12 connected in series with the glow discharge device N10, having no current flowing through it, allows the convert pulses from the terminal 23 to reach the grid of the combining tube V16A of the convert pulse combining circuit 121 for delivery to the transmitting code translator at the terminal 24. When the automatic telegraph signalling system begins to cycle, one convert pulse may appear and must be gated out and stored. Under these conditions, the anode of the counter-on information tube V5B is at a negative potential which blocks the counter-on gating tube V14B. The relatively high anode potential of the tube V14B at this time causes the glow discharge device N10 to conduct through the diode D12 preventing this one pulse appearing at terminal 23 from being applied to the grid of the convert pulse combining tube V16A. While the system is cycling, the convert pulse is gated out but the circuit is arranged to store this convert pulse for use after cycling is completed. With the gating tube V14B blocked, the diode D14 ceases to conduct and the convert pulse appearing across the diode D14 from the terminal 23 is no longer gated out but is applied to the anode of the tube V15A of the convert pulse store 119 by rendering the tube V15A of the bistable reciproconductive circuit conducting and blocking the other tube V15B.

Two triode tubes V10A and V10B are cross coupled in a conventional monostable reciproconductive circuit 163 which is activated normally by negative pulses at the terminals 27 from the storage and switching apparatus 17 when the cycling control apparatus 21 is in the quiescent state. The output potential of the counter-on gating tube V5B controls the reciproconductive circuit 163 indirectly through the storage and switching apparatus 17. By means of a switch S2, the negative going transition of either anode of the V10A or V10B can be used to derive an operating pulse. Pulse time is controlled by the value of capacitor 167 and the resistors 168 connected to the grid of the output tube V11. This pulse blocks the output tube V11 and causes the anode to apply a pulse of predetermined duration and ground potential at the terminal 26 for delivery to the transmitting extensor 11. After cycling is completed, pulses will appear on the anode of the tube V10A from the storage and switching apparatus 17 to activate the reciproconductive circuit 163. The first time the anode of the tube V10A is rendered conducting, the negative transition thereat is applied to reciproconductive circuit 159 to trigger the same to the non-store state with the tube V15B conducting. With the anode of the tube V15B going negative, the transition is used to deliver a convert pulse to the grid of the combining tube V16A of the convert pulse combining circuit 121 and the previous convert pulse stored in the convert pulse store 119 is applied to the transmitting code translator 15.

A diode D11 in the cathode connections of the gating tube V14A of the counter-on gate and idle gate 118 is used to gate out pulses from the receiving diplex terminal apparatus 31 to the receiving code translator 33 at the terminal 51. When the automatic telegraph system is cycling, the anode of the gating tube V1A of the counter gate 101 is at a relatively high potential placing the grid of the gating tube V14A at a relatively high potential causing this tube to conduct through the diode of D11 to gate out the convert pulses.

Whenever the receiving code translator 33 applies a negative voltage to the grid of either tube V12A or V12B indicating idle alpha or idle beta information respectively, the anode of either gating tube V12A or V12B will be at a high potential and cause the idle gate V14A to conduct through the diode D11 to gate out the convert pulses. At the same time either diode D9 or D10 in the cathode circuits of the alpha gating tube V12A or the beta gating tube V12B respectively is blocked. Depending on which idle signal is received, the synchronizing pulse as repeated at the cathode of the isolating tube V4B will be applied to the anode of one of the two tubes V13A and V13B constituting a bistable reciproconductive circuit serving as an idle signal indicating circuit 115. If the diode D9 is blocked by idle alpha information applied to the alpha gating tube V12A, the tube V13A will conduct. The low potential at the anode of the tube V13A will then cause the glow discharge device N5 to conduct, indicating that the last idle signal was idle alpha. The glow discharge device N6 will conduct if the diode D10 is blocked to indicate that idle beta was the last incoming idle signal.

Two triode tubes V9A and V9B and two glow discharge devices N3 and N4 are incorporated in the circuit to indicate the reason the system is cycling. Normally the grid of the tube V9B is at a potential slightly higher than ground and the tube is conducting. With low potential at the anode of the tube V9B, the signal I indicator device N3 and the mutilation indicator device N4 cannot conduct, regardless of potential at the grid of the signal I indicating tube V9A. This condition holds normally for the second, third and fourth intervals because of the positive voltage at the anode of the first count interval output V5A which is applied to the grid of the tube V9A. During the first interval of every count of four intervals, the grid of the tube V9B will be at negative potential. This blocks the tube V9B and makes available the relatively high potential at the anode of the tube V9B to strike the glow discharge devices N3 and N4. One of these devices will conduct during this interval only. If the signal I cycler control 111 is not activated the anode of the tube V8A will be at negative potential and will block the tube V9A, presenting an open circuit to the glow discharge device N3. The glow discharge device N4 will then strike to indicate that the mutilation cycler control 109 was activated by information from the receiving code translator 33 indicating that a character has been received in mutilated condition. Had the signal I cycler control 111 been activated instead, the tube V29A would conduct and the glow discharge device N3 would strike because of the greater voltage due to the cathode of the tube V9A being at a negative potential whereas the glow discharge device N3 returns to ground potential. With the glow discharge device N3 conducting a low potential at the anode of the other indicator tube V9B prevents glow discharge device N4 from striking. This serves to indicate that the cycling was started in response to the receipt of signal I character.

The switch SW1 constituting request switch is used to render the cycling control apparatus 21 unresponsive to either an indication of mutilation or the receipt of the repetition request character by the code translator 33. This switch also insures a proper starting condition for the reciproconductive circuits 127, 128, 132 and 133 by removing the negative potential from the appropriate grids of these four binary reciproconductive circuits.

The invention claimed is:

1. Cycling control apparatus for use with an automatic request and repetition telegraph signaling system including transmitter extensor, code translator, storage and switching apparatus, receiving code translator and extensor apparatus, said control apparatus comprising locking means responsive to operation of said receiving code translator indicating receipt of a predetermined character requesting repetition or receipt of a mutilated character to lock up both the transmitting and receiving extensor and code translator apparatus, delay means for shaping and timing operating pulses from the storage and switching apparatus for delivery to the transmitting extensor apparatus, storing means coupled to said delay means to store the last normal operating pulse from the transmitting extensor apparatus for application to the transmitting code translator apparatus, counting means connected to said extensor apparatus to produce pulses in timed relationship to the operation of said automatic telegraph signaling system, means coupled to said counting means to apply pulses to said storage and switching apparatus to activate the same at first count and after the last count, indicating means coupled to said locking means for showing the receipt of said predetermined character or a mutilated character as the basis for cycling, further indicating means coupled to said locking means for showing the detection of prearranged code characters by said receiving code translator apparatus, blocking means coupled to said further indicating means to block operating pulses from said receiving extensor apparatus to said receiving code translator apparatus upon detection of said prearranged characters, gating means coupled to said receiving code translator apparatus and arranged to release said transmitting and receiving apparatus on subsequent detection of said predetermined character in said receiving code translator apparatus, and further gating means coupled to said locking means and to said counting means to continue cycling in the event that subsequent detection occurs simultaneously with activation of the first said gating means.

2. Cycling control apparatus for use with an automatic request and repetition telegraph signaling system including transmitting extensor, code translator, storage and switching apparatus, receiving code translating and extensor apparatus, said control apparatus comprising locking means responsive to operation of said receiving code translator indicating receipt of a predetermined character or receipt of a mutilated character to lock up both the transmitting and receiving extensor and code translator apparatus for a predetermined number of character intervals, counting means to count off said predetermined number of characters, means coupled to said counting means to apply pulses to said storage and switching apparatus to activate the same at the first count and after the last count, delaying means for shaping and timing operating pulses from the storage and switching apparatus for delivery to the transmitting extensor apparatus, storing means coupled to said delaying means to store the last operating pulse from the transmitting extensor apparatus for said predetermined number of character intervals for subsequent application to the transmitting code translator apparatus, gating means coupled to said receiving code translator apparatus and arranged to release said transmitting and receiving apparatus on subsequent detection of said predetermined character in said receiving code translator apparatus, and further gating means coupled to said counting means and to said locking means and arranged to continue cycling in the event that subsequent detection occurs simultaneously with activation of the first said gating means.

3. Cycling control apparatus for use with an automatic request and repetition telegraph signaling system including transmitting extensor, code translator, storage and switching apparatus, receiving code translating and extensor apparatus, said control apparatus comprising counting means coupled to said extensor apparatus to count off predetermined number of characters, locking means responsive to operation of said receiving code translator indicating receipt of a predetermined character or receipt of a mutilated character to lock up both the transmitting and receiving extensor and code translator apparatus for said predetermined number of character intervals, means coupled to said counting means to apply pulses to said storage and switching apparatus to activate the same at the first count and after the last count and gating means coupled to said receiving code translator apparatus and arranged to release said transmitting and receiving apparatus on subsequent detection of said predetermined character in said receiving code translator apparatus.

4. In an automatic request and repetition telegraph system, control apparatus including a circuit to be activated by application of electric energy, a normally closed gating circuit coupled to the first said circuit for application of said electric energy, a plurality of bistable reciproconductive circuits coupled to said gating circuit and arranged normally to maintain said gating circuit in closed condition, each of said bistable reciproconductive circuits having an individual gating circuit coupled thereto for triggering the associated reciproconductive circuit to the other state of conduction to open the first said gating circuit in response to potential applied to said individual gating circuit under consideration, one of said reciproconductive circuits having connections to another of said reciproconductive circuits to prevent retriggering of said one reciproconductive circuit to the normal state to close the first said gating circuit until said other reciproconductive circuit has been triggered.

5. In an automatic request and repetition telegraph system, control apparatus including a counter circuit to be activated by application of pulses at predetermined rate, a normally closed gating circuit coupled to said counter circuit for application of said pulses, a pair of bistable reciproconductive circuits coupled to said gating circuit and arranged normally to maintain said gating circuit in closed condition, each of said bistable reciproconductive circuits having an individual gating circuit coupled thereto for triggering the associated reciproconductive circuit to the other state of conduction to open the first said gating circuit in response to potential applied to said individual gating circuit under consideration, one of said reciproconductive circuits having connections to the other of said reciproconductive circuits to prevent retriggering of said one reciproconductive circuit to the normal state to close the first said gating circuit until said other reciproconductive circuit has been triggered.

6. Control apparatus as defined in claim 5 and wherein further connections are made between said counter circuit and said reciproconductive circuits to prevent retriggering of said one reciproconductive circuit until said other reciproconductive circuit has been triggered and said counting circuit has reached a prearranged count.

7. Control apparatus as defined in claim 6 and wherein said reciproconductive circuits have other individual gating circuits coupled thereto with characteristics opposite to those of said individual gating circuits, said other gating circuits being interposed in said further connections.

8. In an automatic request and repetition telegraph system, control apparatus including a counter circuit to be activated by application of pulses at predetermined rate a normally closed gating circuit coupled to said counter circuit for application of said pulses, a pair of bistable reciproconductive circuits coupled to said gating circuit and arranged normally to maintain said gating circuit in closed condition, each of said bistable reciproconductive circuits having two individual gating circuits of opposite characteristics coupled thereto for triggering the associated reciproconductive circuit to the two states of conduction to open and close the first said gating circuit in response to potential applied to said individual gating circuits under consideration, one of said reciproconductive circuits having connections to the other of said reciproconductive circuits to prevent retriggering of said one reciproconductive circuit to the normal state to close the first said gating circuit until said other reciproconductive circuit has been triggered.

9. Control apparatus as defined in claim 5 and wherein further connections are made between said counter circuit and said reciproconductive circuits to prevent retriggering of said one reciproconductive circuit until said other reciproconductive circuit has been triggered and said counting circuit has reached a prearranged count.

10. Control apparatus as defined in claim 9 and wherein an additional gating circuit is interposed in said further connections to control activation of said counting circuit.

11. Cycling control apparatus for use with an automatic request and repetition telegraph signaling system including transmitting extensor, code translator, storage and switching apparatus, receiving code translator and extensor apparatus, said control apparatus comprising counting means connected to said extensor apparatus to produce pulses in timed relationship to the operation of said automatic telegraph signaling system, locking means coupled to said counting means to block the same in response to operation of said receiving code translator indicating receipt of a predetermined character requesting repetition or receipt of a mutilated character to lock up both the transmitting and receiving extensor and code translator apparatus, means coupled to said counting means to apply pulses to said storage and switching apparatus to activate the same at first count and after the last count, blocking means coupled to said locking means to block operating pulses from said receiving extensor apparatus to said receiving code translator apparatus upon detection of prearranged characters by said receiving code translator apparatus, gating means coupled to said receiving code translator apparatus and arranged to release said transmitting and receiving apparatus on subsequent detection of said predetermined character in said receiving code translator apparatus, and further gating means coupled to said locking means and to said counting means to continue cycling in the event that subsequent detection occurs simultaneously with activation of the first said gating means.

12. Cycling control apparatus for use with an automatic request and repetition telegraph signaling system, said control apparatus comprising synchronizing pulse input terminals, a normally closed counter gate and a counter circuit coupled in series relationship to said synchronizing pulse input terminals, a pair of reciproconductive circuits each having an individual triggering gate coupled thereto and to said synchronizing pulse input terminals, each of said reciproconductive circuits having a retriggering gate coupled thereto, one of said retriggering gates being connected to the other reciproconductive circuit and the other of said retriggering gates being connected to said counter circuit, a common circuit coupling said reciproconductive circuits to said counter gate, and signal input terminals individually coupled to said triggering gates to open said counter gate upon the application of potential to either set of signal input terminals, said counter gate being closed in one instance by removal of said potential and in the other instance only by removal of said potential after application of potential to the other set of signal input terminals.

13. Cycling control apparatus as defined in claim 12 and wherein said other retriggering gate is connected to said counter circuit to prevent closing of said counter gate prior to said counter attaining a prearranged count.

14. Cycling control apparatus as defined in claim 12 and wherein an output circuit is coupled to said counter to provide an output potential upon said counter attaining a predetermined count, and an indicator coupled between said output circuit and one of said reciproconductive circuits for indicating that said count has been attained.

15. Cycling control apparatus as defined in claim 12 and incorporating an indicating circuit having two signal gates coupled thereto and to said synchronizing pulse input terminals, and sets of corresponding signal input terminals individually connected to said signal gates to trigger said indicating circuit at incidence of said synchronizing pulses upon application of potential to one of said sets of corresponding signal input terminals to indicate which of the corresponding signals was applied.

16. Cycling control apparatus as defined in claim 15 and wherein a further gating circuit is connected between said special signal gates and said common circuit to open and close an electric circuit path for use with associated circuitry in response to applied signals.

17. Cycling control apparatus as defined in claim 12 and wherein a further gate is connected to said common circuit to pass pulses to and from associated apparatus in timed relationship to the operation of the automatic telegraph signaling system under normal signaling conditions and to block said pulses under cycling conditions, and a storage circuit arranged to store one of said pulses and to pass said pulse upon the signaling system resuming normal signaling conditions.

18. Cycling control apparatus as defined in claim 17 and wherein a pulse delay circuit is incorporated in said apparatus to delay operating pulses passing between associated apparatus, and a connection between said pulse delay circuit and said storage circuit to deliver said stored pulse in timed relationship to the operation of said automatic telegraph signaling system.

19. Cycling control apparatus as defined in claim 17 and wherein a pulse combining circuit is interposed in the connections of said further gate and said storage circuit, and a pulse delay circuit is incorporated in the apparatus to time operating pulses obtained from associated apparatus for delivering to other associated apparatus, there being a connection between said pulse delay circuit and said storage circuit to deliver the pulses stored therein to said pulse combining circuit upon said signaling system commencing normal operation.

References Cited in the file of this patent
UNITED STATES PATENTS
2,680,241  Gridley ______________ June 1, 1954